US007010234B2

(12) United States Patent
Chaput

(10) Patent No.: US 7,010,234 B2
(45) Date of Patent: Mar. 7, 2006

(54) ALL-OPTICAL REGENERATOR FOR RETIMING, RESHAPING AND RETRANSMITTING AN OPTICAL SIGNAL

(75) Inventor: Brian A. Chaput, Dallas, TX (US)

(73) Assignee: Alcatel Optronics USA, Inc., Plano, TX (US)

(*) Notice: Subject to any disclaimer, the term of this patent is extended or adjusted under 35 U.S.C. 154(b) by 725 days.

(21) Appl. No.: 10/207,540

(22) Filed: Jul. 29, 2002

(65) Prior Publication Data
US 2004/0018020 A1    Jan. 29, 2004

(51) Int. Cl.
H04B 10/02    (2006.01)
H04B 10/00    (2006.01)
(52) U.S. Cl. ...................... 398/175; 398/152; 398/155; 398/154; 398/177; 398/173
(58) Field of Classification Search ................ 398/175, 398/152, 154, 155, 159, 160, 161, 173, 174, 398/176–181; 359/494, 485; 385/11
See application file for complete search history.

(56) References Cited

U.S. PATENT DOCUMENTS

| 5,781,326 | A | * | 7/1998 | Chiaroni et al. ............ 359/237 |
| 5,798,852 | A | * | 8/1998 | Billes et al. ................ 398/155 |
| 6,078,416 | A | * | 6/2000 | Yano ........................... 398/154 |
| 6,931,212 | B1 | * | 8/2005 | Leuthold et al. ............ 398/175 |
| 2002/0105706 | A1 | * | 8/2002 | Ueno ........................... 359/179 |
| 2003/0076563 | A1 | * | 4/2003 | Lemoff et al. ............... 359/158 |
| 2004/0037489 | A1 | * | 2/2004 | Robinson et al. ............. 385/16 |

OTHER PUBLICATIONS

G. Raybon et al. "20Gbit/s All-Optical Regeneration and Wavelength Conversion Using SOA Based Interferometers", Lucent Technologies, 3 pages.

T. Otani et al. "40-Gb/s Optical 3R Regenerator Using Electroabsorption Modulators for Optical Networks", Journal of Lightwave Technology, vol. 20, No. 2, pp. 195-200, Feb. 2002.
J. Nakagawa et al. "All-Optical 3R Regeneration Technique Using Injection-Locking In Gain-Switched DFB-LD", Electronics Letters, vol. 37, No. 4, pp. 231-232, Nov. 28, 2000.
Alcatel 1901 ICM—10 Gbit/s All-Optical Interferometric Wavelength Converter Counter-Propagating Configuration—2 pages, Jan. 2002.

* cited by examiner

Primary Examiner—M. R. Sedighian
Assistant Examiner—Quan-Zhen Wang
(74) Attorney, Agent, or Firm—Patterson & Sheridan

(57) ABSTRACT

An all-optical 3R regenerator (AO3R) and a method for using the AO3R to retime, reshape and retransmit an optical signal are described herein. The AO3R includes a polarizer that receives an input optical signal which is of unknown, potentially varying phase and outputs a stable polarized input optical signal. The AO3R also includes a first interferometer (e.g., interferometric converter module) that retimes and reshapes the polarized input optical signal and transmits the retimed and reshaped polarized input optical signal as a polarized output optical signal. The first interferometer is able to retime the polarized input optical signal with the aid of a laser and a clock recovery mechanism. The clock recovery mechanism is basically an electrical feedback loop that uses a second interferometer and various electrical components to recapture a clock signal of the polarized input optical signal by comparing a data stream in the polarized input optical signal to a data stream in the polarized output optical signal. The laser uses the recaptured clock signal to drive the first interferometer so that it can retime the polarized input optical signal.

36 Claims, 6 Drawing Sheets

ALL-OPTICAL REGENERATOR FOR RETIMING, RESHAPING AND RETRANSMITTING AN OPTICAL SIGNAL

BACKGROUND OF THE INVENTION

1. Field of the Invention

The present invention relates in general to a wavelength division multiplexing (WDM) optical network and, in particular, to an all-optical 3R regenerator (AO3R) and method for using the AO3R to retime, reshape and retransmit an optical signal in the WDM optical network.

2. Description of Related Art

WDM optical networks and in particular the optical signals traveling therein are distorted by a variety of transmission impairments. These transmission impairments can be induced by factors such as accumulated noise from optical amplifiers, waveform distortion, and nonlinear interaction in optical transmission fibers. Because, the WDM optical networks and optical signals are adversely affected by transmission impairments some type of optical signal regeneration scheme must be applied along the transmission path. Reference is made to the WDM optical network 100 shown in FIG. 1 to describe several traditional devices used to regenerate optical signals.

The WDM optical network 100 basically includes a series of transmitters 102 coupled to inputs of a multiplexer 104 which has an output coupled to one end of a transmission path 106. The other end of the transmission path 106 is coupled to an input of a demultiplexer 108 which has outputs coupled to a series of receivers 110. Depending on the length of the transmission path 106 there can be located therein one or more amplifiers 112 (only two shown) and one or more repeaters 114 (only one shown). The amplifiers 112 and repeaters 114 are used to compensate for the different transmission impairments that adversely affect the optical signal 116a. In particular, the amplifiers 112 shown as erbium-doped fiber amplifiers (EDFAs) are used to amplify the optical signals 116a and 116b. And, the repeater 114 which can be an electrical regenerator (O/E/O regenerator) 114a or an AO3R 114b is used to retime, reshape, retransmit the optical signal 116a as optical signal 116b. The repeater 114 can also be an all-optical 2R regenerator (AO2R) 114c that reshapes and retransmits the optical signal 116a but does not retime the optical signal 116a. Thus, the AO2R 114c has limited applications.

The O/E/O regenerator 114a includes opto-electronic circuits and electronic circuits that convert the optical signal 116a into an electrical signal that is retimed and reshaped in the electrical domain. The retimed and reshaped electrical signal is then converted back into an optical signal 116b and retransmitted by the traditional O/E/O regenerator 114a. An example a traditional O/E/O regenerator 114a is briefly discussed below with respect to FIG. 2.

Referring to FIG. 2, there is illustrated a block diagram of the basic components of an exemplary traditional O/E/O regenerator 114a. The O/E/O regenerator 114a includes a receiver 200 and a transmitter 230. The receiver 200 includes a photo diode 202 (e.g., PIN or APD) that converts the optical signal 116a to an electrical signal 204. The electrical signal 204 is amplified by an amplifier 206 and then divided and inputted into a clock recovery device (CDR) 208 and a phase comparator 210. The phase comparator 210 compares the amplified electrical signal 204 to an electrical signal 212 generated by the CDR 208 and outputs a retimed electrical signal 214 (shown as data (D) signal). The retimed electrical signal 214 is then divided and inputted into a low pass filter (LPF) 216 and the transmitter 230. The low pass filter 216 filters the retimed electrical signal 214 and outputs an averaged electrical signal 218. A voltage controlled oscillator (VCO) 220 receives the averaged electrical signal 218 and outputs a clock signal 222 (shown as clock (C) signal). The clock signal 222 is then divided by a power divider 224 and inputted into the CDR 208 and the transmitter 230. Thus, a feedback loop which includes the phase comparator 210, LPF 216, VCO 220, power divider 224 and CDR 208 is used to retime the electrical signal 204 and output the retimed electrical signal 214 (D signal).

The transmitter 230 receives the retimed electrical signal 214 (D signal) and the clock signal 222 (C signal) from the receiver 200. The transmitter 230 includes a flip-flop circuit (F/F) 232 that compares the retimed electrical signal 214 and the clock signal 222 to another clock signal 234 generated by clock 236. The F/F 232 outputs a regenerated data signal 238 to a laser 240. The laser 240 receives the regenerated data signal 238 and outputs a retimed, reshaped optical signal 116b that is transmitted from the transmitter 230 onto the transmission path 106 of the WDM optical network 100. There are a number of disadvantages associated with the O/E/O regenerator 114a. First, the O/E/O regenerator 114a is made from elaborate, cumbersome and expensive optoelectronic circuits and electronic circuits. Secondly, the O/E/O regenerator 114a requires and consumes a lot of power.

The AO3R 114b is expected to replace the O/E/O regenerator 114a, because the AO3R 114b is less expensive and requires less power than the O/E/O regenerator 114a. In addition, the AO3R 114b can directly process the optical signal 116a in the optical domain without converting the optical signal 116a into an electrical signal as required by the O/E/O regenerator 114a. However, traditional AO3Rs 114b are known by those skilled in the art to have very complicated and elaborate clock recovery schemes that attempt to recapture the clock signal from a data stream in the optical signal 116a. The AO3Rs need to recapture the clock signal of the optical signal 116a to properly output a retimed optical signal 116b. Examples of three traditional AO3Rs 114b have been described in the following documents which are incorporated by reference herein:

G. Raybon et al. "20 *Gbit/s All-Optical Regeneration and Wavelength Conversion Using SOA Based Interferometers*", Lucent Technologies, 3 pages.

T. Otani et al. "40-*Gb/s Optical 3R Regenerator Using Electroabsorption Modulators for Optical Networks*", Journal of Lightwave Technology, Vol. 20, No. 2, pages 195–200, February 2002.

J. Nakagawa et al. "*All-Optical 3R Regeneration Technique Using Injection-Locking In Gain-Switched DFB-LD*", Electronics Letters, Vol. 37, No. 4, pages 231–232, Nov. 28, 2000.

Accordingly, there is a need for an AO3R that has a clock recovery scheme that can recapture a clock signal from a data stream of a received optical signal in a manner that is more simplistic and effective than the elaborate clock recovery schemes used in traditional AO3Rs. This need and other needs are satisfied by the AO3R and method of the present invention.

BRIEF DESCRIPTION OF THE INVENTION

The present invention includes an 3R regenerator (AO3R) and a method for using the AO3R to retime, reshape and retransmit an optical signal. The AO3R includes a polarizer that receives an input optical signal which is of unknown, potentially varying phase and outputs a stable polarized input optical signal. The AO3R also includes a first interferometer (e.g., interferometric converter module) that retimes and reshapes the polarized input optical signal and transmits the retimed and reshaped polarized input optical signal as a polarized output optical signal. The first interferometer is able to retime the polarized input optical signal with the aid of a laser and a clock recovery mechanism. The clock recovery mechanism is basically an electrical feedback loop that uses a second interferometer and various electrical components to recapture a clock signal of the polarized input optical signal by comparing a data stream in the polarized input optical signal to a data stream in the polarized output optical signal. The laser uses the recaptured clock signal to drive the first interferometer so that it can retime the polarized input optical signal.

BRIEF DESCRIPTION OF THE DRAWINGS

A more complete understanding of the present invention may be had by reference to the following detailed description when taken in conjunction with the accompanying drawings wherein.

DETAILED DESCRIPTION OF THE DRAWINGS

Referring to FIGS. 3–7, wherein like numerals represent like parts throughout the several views, there are disclosed in accordance with the present invention a WDM optical network 300, an AO3R 314 (three embodiments) and a method 500 for using the AO3R 314 to retime, reshape and retransmit an optical signal 316a.

Figure 3:
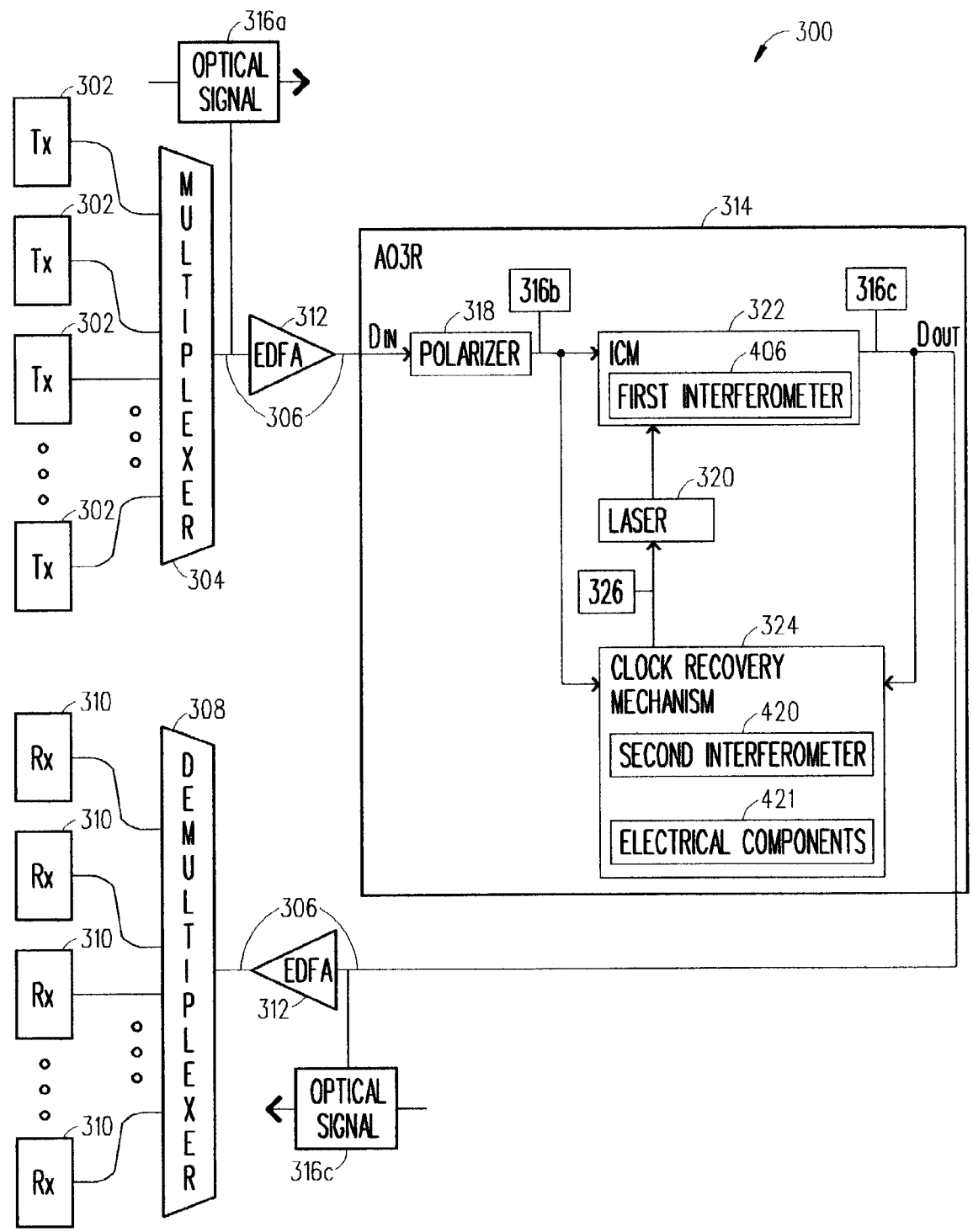
FIG. 3 is a block diagram illustrating a WDM optical network incorporating an AO3R of the present invention.

Referring to FIG. 3, there is shown a block diagram illustrating the WDM optical network 300 and the AO3R 314 in accordance with the present invention. Certain details and components associated with the WDM optical network 300 are well known to those skilled in the art and as such, for clarity, are not described herein. Therefore, the description provided below in relation to the WDM optical network 300 omits those components not necessary to understand the invention.

The WDM optical network 300 includes a series of transmitters 302 coupled to inputs of a multiplexer 304 which has an output coupled to one end of a transmission path 306. The other end of the transmission path 306 is coupled to an input of a demultiplexer 308 which has outputs coupled to a series of receivers 310. Depending on the length of the transmission path 306 there can be located therein one or more amplifiers 312 (only two shown) and one or more AO3Rs 314 (e.g., repeaters)(only one shown). The amplifiers 312 and the AO3Rs 314 are used to compensate for transmission impairments that adversely affect an optical signal 316a transmitted from one of the transmitters 302 to one of the receivers 310. The transmission impairments are induced by factors including, for example, accumulated noise from optical amplifiers, waveform distortion, and nonlinear interaction in optical transmission fibers.

Figure 1:
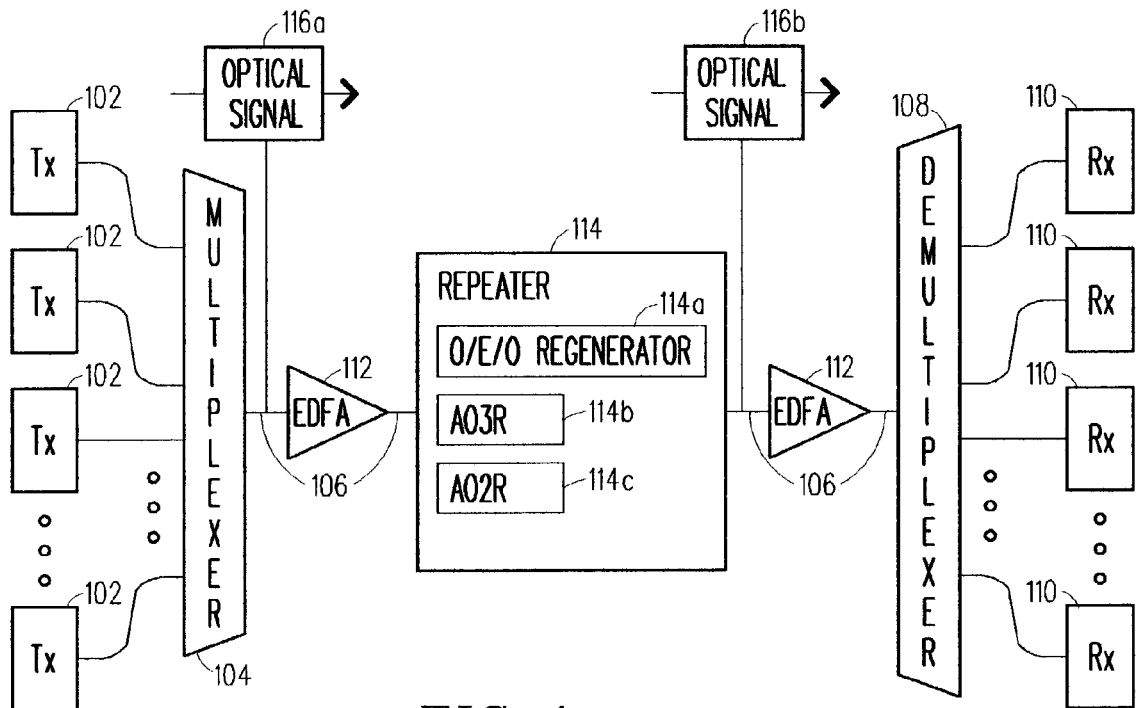
FIG. 1 (PRIOR ART) is a block diagram illustrating the basic components of a traditional WDM optical network.
Figure 2:
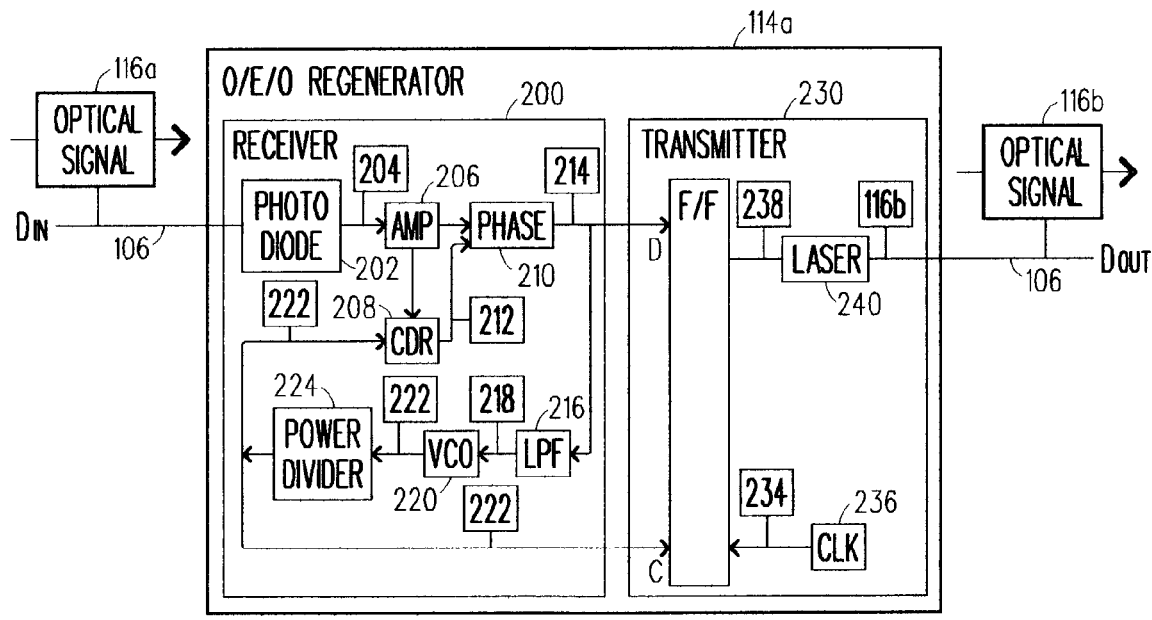
FIG. 2 (PRIOR ART) is a block diagram illustrating the basic components of a traditional O/E/O regenerator used in the WDM optical network shown in FIG. 1.

The AO3R 314 does more to compensate for transmission impairments in the optical signal 316a than the amplifier 312. The amplifier 312 (e.g., erbium-doped fiber amplifiers (EDFAs)) is used to amplify the optical signal 316a. In contrast, the AO3R 314 is used to retime, reshape and retransmit the optical signal 316a. As described above, the AO3R 314 is able to retime, reshape and retransmit the optical signal 316a while it is in the optical domain without having to convert the optical signal 116a into an electrical signal as is done by the traditional O/E/O regenerator 114a (see FIGS. 1 and 2).

The AO3R 314 includes a polarizer 318, a laser 320, an interferometric converter module 322 and a clock recovery mechanism 324. The polarizer receives and stabilizes the input optical signal 316a that is of unknown, potentially varying phase and outputs a stable polarized input optical signal 316b. The input optical signal 316a has an unknown, potentially varying phase because of the aforementioned transmission impairments. The interferometric converter module 322 (also described herein as a first interferometer 406) receives the polarized input optical signal 316b and retimes and reshapes the polarized input optical signal and transmits the retimed and reshaped polarized input optical signal 316b as a polarized output optical signal 316c. As shown, the polarized output optical signal 316c is transmitted from the AO3R 314 on the transmission path 306 of the WDM optical network 300.

It is well known in the field how the interferometric converter module 322 can be made to reshape and retransmit the polarized input optical signal 316b. However, it is not well known in the field how the interferometric converter module 322 can be made to retime the polarized input optical signal 316b. Therefore, how the interferometric converter module 322 can be made in accordance with the present invention to retime the polarized input optical signal 316b is described in the following paragraph and in the description associated with FIGS. 4 and 5.

The interferometric converter module 322 is able to retime the polarized input optical signal 316b, because the clock recovery mechanism 324 can effectively recapture a clock signal from the data stream in the polarized input optical signal 316b. The recaptured clock signal 326 is used to modulate the laser 320 which then interacts with and drives the interferometric converter module 322 to retime the polarized input optical signal 316b. Basically, the clock recovery mechanism 324 uses an electrical feedback loop to recapture the clock signal 326 from the polarized input optical signal 316b. In particular, the clock recovery mechanism 324 uses a second interferometer 420 to compare a data stream in the polarized input optical signal 316b to a data stream in the polarized output optical signal 316c the results of which are used by electrical components 421 (see phase comparator 410, O/E converter 412, LPF 414 and VCO 416 in FIG. 4) to generate the recaptured clock signal 326. A preferred embodiment of the AO3R 314 and the clock recovery mechanism 324 are described in greater detail below with respect to FIGS. 4–5.

Figure 4:
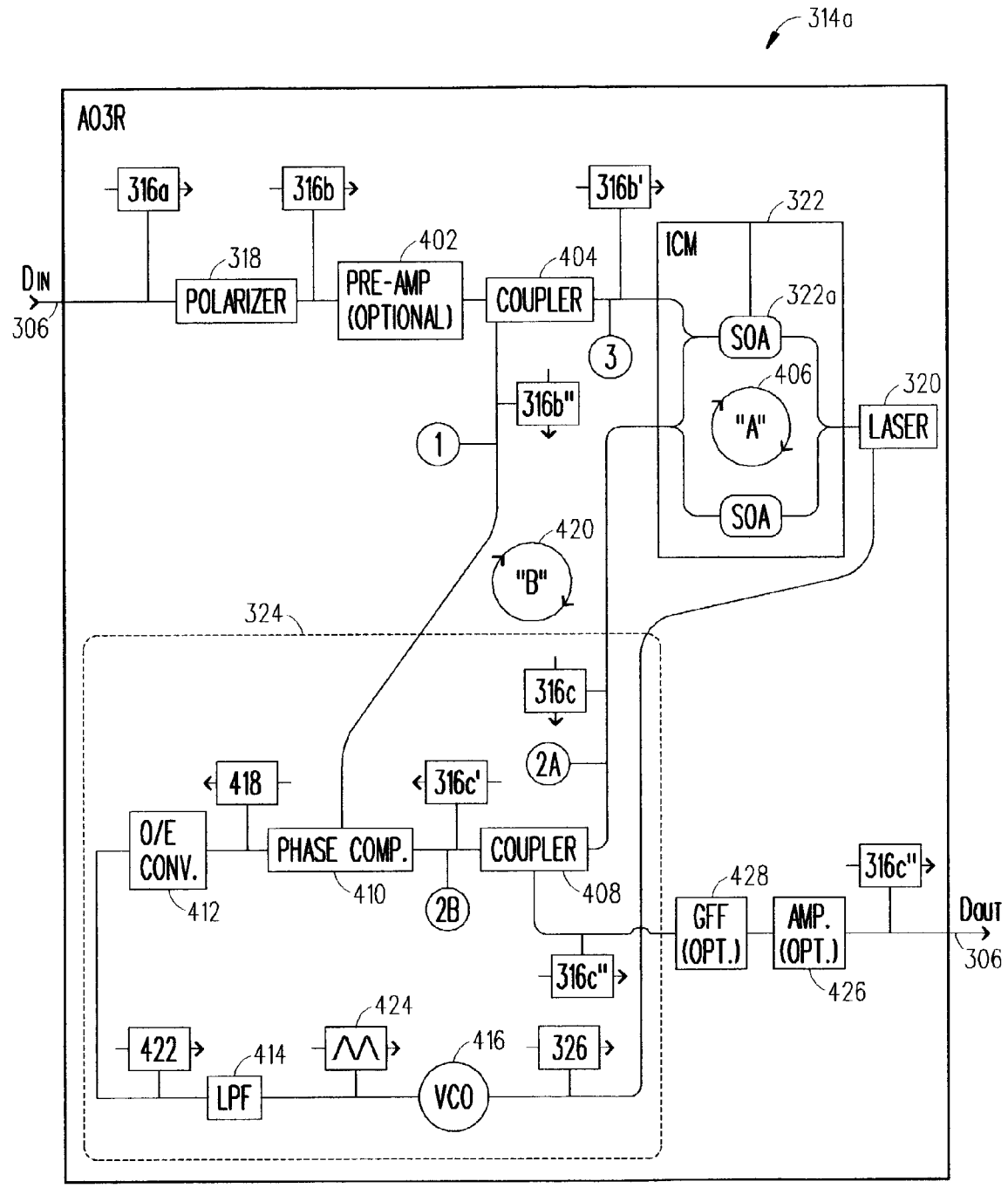
FIG. 4 is a block diagram illustrating in greater detail the components of a first embodiment of the AO3R shown in FIG. 3.
Figure 5:
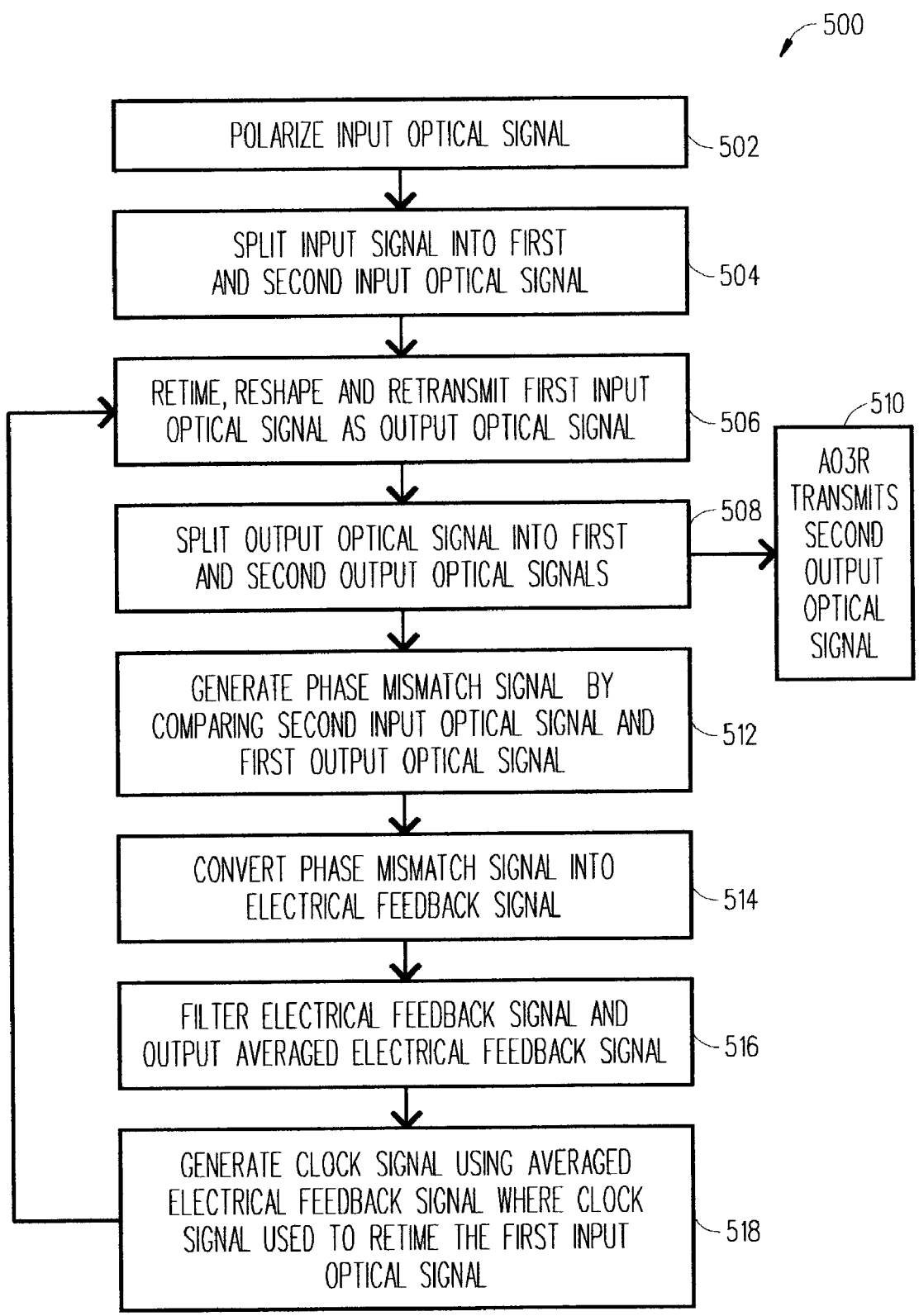
FIG. 5 is a flowchart illustrating the basic steps of a preferred method for using the AO3R shown in FIGS. 3 and 4.

Referring to FIGS. 4 and 5, there are shown a block diagram illustrating in greater detail the components of a first embodiment of the AO3R 314a and a flowchart illustrating the basic steps of a preferred method 500 for using the AO3R 314a. In the first embodiment, the AO3R 314a includes the polarizer 318 which receives and stabilizes/polarizes (step 502) the input optical signal 316a that has an unknown, potentially varying phase because of the aforementioned transmission impairments. The polarizer 318 then outputs a polarized input optical signal 316b onto a polarization maintaining fiber (PMF) or a polarization maintaining waveguide. It should be understood that the particular orientation of the polarized input optical signal 316b is not necessarily important, but it is necessarily important to maintain the orientation of the polarized input optical signal 316b within the AO3R 314a. Thus, all of the elements that make-up the AO3R 314a are connected to one another using polarization maintaining fiber (PMF) or a polarization maintaining waveguide.

The polarized input optical signal 316a can be amplified by a preamplifier 402 to broaden the optical range and also stabilize the power level of the polarized input optical signal 316b. The use of the preamplifier 402 in the AO3R 314a is optional. Alternatively, the preamplifier 402 may be placed in front of the polarizer 318 for better polarization stability in some embodiments.

A first coupler 404 receives the polarized input optical signal 316b from the preamplifier 402 (if any) or the polarizer 318. The first coupler 404 then splits (step 504) the polarized input optical signal 316b and outputs a first polarized input optical signal 316b' and a second polarized input optical signal 316b". The first and second polarized optical signals 316b' and 316b" are essentially the same signals.

The interferometric converter module 322 which includes a first interferometer 406 shown as loop "A" receives the first polarized input optical signal 316b' and then retimes, reshapes and retransmits (step 506) the first polarized input optical signal 316b' as a polarized output optical signal 316c. Stated in another way, the first interferometer 406 retimes and reshapes the first polarized input optical signal 316b' and transmits the retimed and reshaped first polarized input optical signal 316b' as the polarized output optical signal 316c. The first interferometer 406 as shown in this embodiment is configured to have a counter-propagation mode. In the preferred embodiment, the interferometric converter module 322 (e.g., Alcatels 1901 ICM) can either be an in-phase interferometric converter module or an out-of-phase interferometric converter module. As mentioned earlier, it is well known in the field how the interferometric converter module 322 can be made to reshape and retransmit the first polarized input optical signal 316b'. It is also well known in the field how the interferometric converter module 322 can be made to retime the first polarized input optical signal 316b'. However, it is not well-known how to recapture the clock signal from the received data signal 316a and as such this capability is an important aspect of the present invention.

The interferometric converter module 322 is able to retime the polarized input optical signal 316b with the aid of the laser 320 and the clock recovery mechanism 324. The clock recovery mechanism 324 includes a second coupler 408, a phase comparator 410, an optical-to-electrical (O/E) converter 412, a low pass filter (LPF) 414 and a voltage controlled oscillator (VCO) 416. In particular, the second coupler 408 receives the polarized output optical signal 316c from the interferometric converter module 322. The second coupler 408 splits (step 508) the polarized output optical signal 316c and outputs a first polarized output optical signal 316c' and a second polarized output optical signal 316c". The first and second polarized output optical signals 316c' and 316c" are essentially the same signals. Like optical signal 316c shown in FIG. 3, the second polarized output optical signal 316c' is transmitted (step 510) from the AO3R 314a on the transmission path 306 of the WDM optical network 300. The AO3R 314a may also include a gain flattening device (GFF) 428 (optional) that can be used to compensate for any wavelength dependent effects within the interferometers 406 and 420. The GFF 428 is shown connected to the output of the second coupler 408. In addition, the AO3R 314a may also include a booster amplifier 426 (optional) that can be used to amplify the second polarized output optical signal 316c" to a desired level. The booster amplifier 426 is shown connected to the output of the GFF 428.

As the AO3R 314a transmits the second polarized output signal 316c", the phase comparator 410 receives the first polarized output signal 316c' from the second coupler 408 and the second polarized input optical signal 316b" from the first coupler 404. The phase comparator 410 generates (step 512) a phase mismatch signal 418 in response to a phase difference between the second polarized input optical signal 316b" and the first polarized output optical signal 316c'. To accomplish this, the phase comparator 410 uses a second interferometer 420 (shown as loop "B") to measure the phase difference between the second polarized input optical signal 316b" and the first polarized output optical signal 316c'. The second interferometer 420 is made up of paths "1", "2A", "2B" and "3" of the polarization maintaining fibers (PMF) or polarization maintaining waveguides.

The phase difference measured by the second interferometer 420 is small when the clock signal in the data stream of the polarized input optical signal 316b is close to the clock signal in the data stream of the polarized output optical signal 316c. In contrast, the phase difference is large when the clock signal in the data stream of the polarized input optical signal 316b is not close to the clock signal in the data stream of the polarized output optical signal 316c. Again, the clock signals between the recently received polarized input optical signal 316b and the output optical signal 316c typically become out-of-phase because of the aforementioned transmission impairments. As such, the transmission impairments can affect the recently received polarized input optical signal 316b differently than the previously received polarized input optical signal 316b which at this point is regenerated to be the polarized output optical signal 316c.

The O/E converter 412 receives the, phase mismatch signal 418 from the phase comparator 410. The O/E converter 412 then converts (step 514) the phase mismatch signal 418 into an electrical feedback signal 422. The LPF 414 receives and filters (step 516) the electrical feedback signal 422 and outputs an averaged electrical feedback signal 424. Basically, the LPF 414 looks at the average effect of several phase mismatch signals 418 and outputs the averaged electrical feedback signal 424. As shown in FIG. 4, the averaged electrical feedback signal 424 may be represented as a triangular waveform. Thus, when the averaged electrical feedback signal 424 is located at the base of the triangular waveform that is an indication that the clock signals are not aligned or have a relatively large phase difference between the polarized input optical signal 316b and the polarized output optical signal 316c. And, when the averaged electrical feedback signal 424 is located at the point of the triangular waveform that is an indication that the clock signals are aligned or have a relatively small phase difference between the polarized input optical signal 316b and the polarized output optical signal 316c.

The VCO 416 (only one shown) receives the averaged electrical feedback signal 424 from the LPF 414. The VCO 416 then generates (step 518) a clock signal 326 that is used to modulate the laser 320 which then interacts with and drives the interferometric converter module 322 to retime the polarized input optical signal 316b.

The clock signal 326 is also referred to herein as the recaptured clock signal of the polarized input optical signal 316b. In particular, the VCO 416 would generate a clock signal 326 that has a frequency that is very close to the frequency of the clock signal in the polarized output optical signal 316c when there is a small phase difference between the polarized input optical signal 316b and the polarized output optical signal 316c. In contrast, the VCO 416 would generate a clock signal 326 that has a different frequency than the frequency of the clock signal in the polarized output optical signal 316c when there is a large phase difference between the polarized input optical signal 316b and the polarized output optical signal 316c. In this way, the laser 320 which is modulated by clock signal 326 is able to drive the interferometric converter module 322 so it can output the polarized output optical signal 316c that has been retimed to the current frequency of the recently received polarized input optical signal 316b.

In the preferred embodiment, the AO3R 314a is made from an all-active interferometric converter module 322 (e.g., all-active Mach-Zender interferometer) and some optical and electrical elements. The optical and electrical elements include the polarizer 318, the laser 320, the first coupler 404, the second coupler 408, the second interferometer 420, the phase comparator 410, the O/E converter 412, the LPF 414 and the VCO 416. The equivalent path lengths of the polarization maintaining fibers (PMF) or polarization maintaining waveguides between the elements that make-up the AO3R 314a are important. For example, the interferometric converter module 322 and in particular the first interferometer 406 located therein is known to have identical path lengths between it's input and output. In addition, the combined paths "1 and 3" and the combined paths "2A and 2B" should be of equal length such as to make the second interferometer 420. Equal path lengths do not necessarily refer to the same physical lengths but instead refers to the lengths needed to maintain the orientation of the optical signals within the AO3R 314a. The entire optical path, except for $D_{OUT}$ should be polarization maintained so that the first and second interferometers 406 and 420 work properly.

Figure 6:
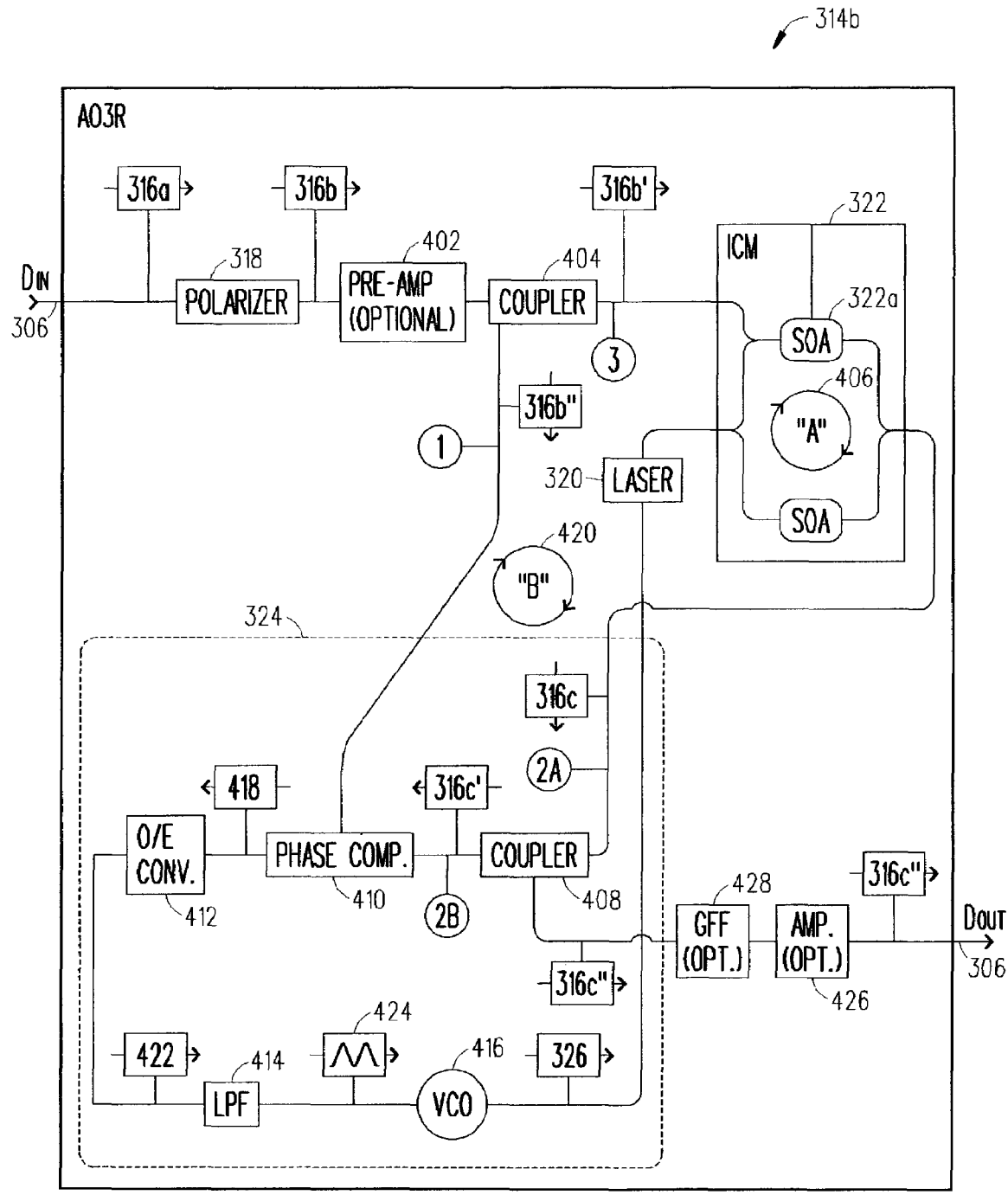
FIG. 6 is a block diagram illustrating in greater detail the components of a second embodiment of the AO3R shown in FIG. 3.
Figure 7:
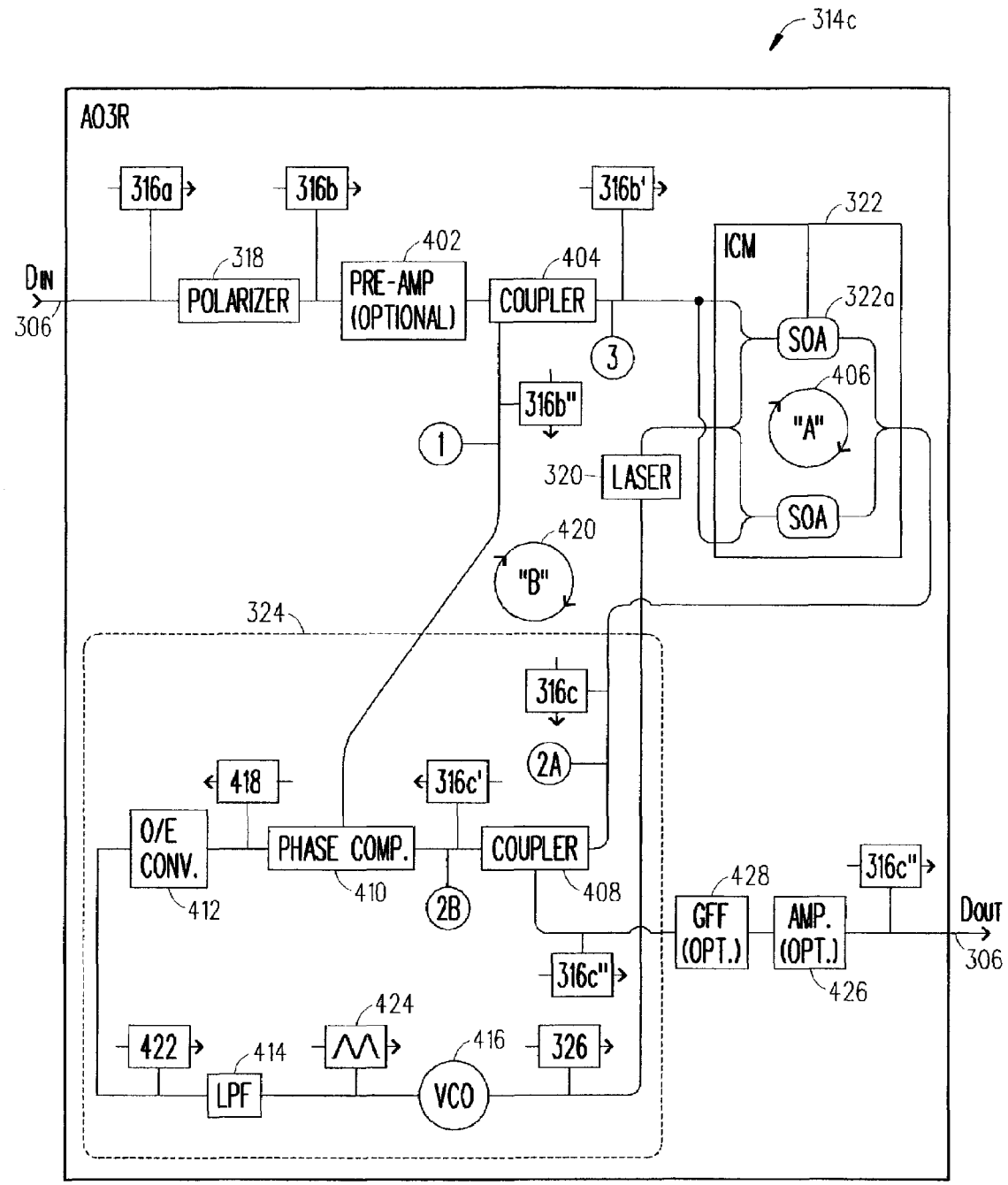
FIG. 7 is a block diagram illustrating in greater detail the components of a third embodiment of the AO3R shown in FIG. 3.

Following is yet another description of what the AO3R 314a does to the optical signal 316a beginning at $D_{IN}$. At $D_{IN}$ the optical signal 316a is polarized. The polarized optical signal 316b (data) is located in a PMF or PM waveguide. The first coupler 404 splits the data into two. The split data proceeds on path "3" into the ICM 322 and on path "1" to the phase comparator 410. The data in the ICM 322 is used to modulate the refractive index inside an upper semiconductor optical amplifier (SOA) 322a (two SOAs 322a are shown in FIGS. 4, 6 and 7). The change in the refractive index exerts a phase shift on the upper path of the interferometer light from the laser 320. The output of the ICM 322 is a reshaped and resent data signal located on a new lightpath shown as path "2A". The reshaped and resent data signal output from the ICM 322 is then split by the second coupler 408 into $D_{OUT}$ and path "2B". $D_{OUT}$ is used to continue transmission. Paths "2A and 2B" are used to interfere with paths "1 and 3" of the data signal. A phase mismatch occurs whenever the timing is off between paths "1 and 3" and paths "2A and 2B". This phase mismatch is put through a phase comparator 410 and converted to an electrical feedback signal 422 at the O/E converter 412. The output from the O/E converter 412 is put through the LPF 414 and used to adjust the set point for the VCO 416. As such, the phase mismatch is used to speed up or slow down the VCO 416 until the set point in the VCO 416 matches more exactly $D_{IN}$. The output of the VCO 416 is then used to drive the laser 320 which interacts with the ICM 322 which in turn generates a retimed new lightpath.

Referring to FIG. 6, there is shown a block diagram illustrating the components of a second embodiment of the AO3R 314b. The AO3R 314b is the same as AO3R 314a except that the first interferometer 406 is configured to have a co-propagation mode instead of a counter-propagation mode as shown in FIG. 4. The AO3R 314b can be used in accordance with method 500. To avoid repetition, the AO3R 314b is not described in detail since it has basically the same structure and functionality as the AO3R 314a described above with respect to the first embodiment.

Referring to FIG. 7, there is shown a block diagram illustrating the components of a third embodiment of the AO3R 314c. The AO3R 314c is the same as AO3R 314a except that the first interferometer 406 is configured to have a differential data co-propagation mode instead of a counter-propagation mode as shown in FIG. 4. The AO3R 314c can be used in accordance with method 500. To avoid repetition, the AO3R 314c is not described in detail since it has basically the same structure and functionality as the AO3R 314a described above with respect to the first embodiment.

From the foregoing, it can be readily appreciated by those skilled in the art that the self-tuning VCO 416 could also react to large source frequency changes which make the AO3R 314 and in particular the ICM 322 adaptable to varying data rates in the data stream of the input optical signal 316a. It should also be readily appreciated by those skilled in the art that the AO3R 314 does not convert the optical signal 316a into the electrical domain in the same manner as the traditional O/E/O 114a which is a major improvement.

Following are a list of some alternatives to the aforementioned components of the present invention:

The laser 320 can be a wavelength tunable laser.

The laser 320 can be a CW laser with an external Lithium Niobate modulator.

The laser 320 can be directly modulated.

A custom unit can be made to incorporate both interferometers 406 and 420.

The ICM 322 is only an interferometer and not an interferometric converter module.

The AO3R 314 could also change the wavelength of the data signals between the input and output ports. For example, data input can arrive on a specific wavelength (e.g., 1550 nm) and the laser 320 can be a different wavelength (e.g., 1540 nm). The modulation effects from the 1550 nm signal will transfer to the 1540 nm CW signal at the output of the first interferometer 406. Thus, the output optical signal 316c" will have the same data as the input optical signal 316a, but can have a completely different wavelength.

The use of Michelson interferometers instead of Mach-Zender interferometers for either or both of the interferometers 406 and 420.

The use of polarization maintaining fiber instead of a polarizer 318 to stabilize the input optical signal 316a.

The use of a polarization mode dispersion compensator unit instead of the polarizer 318. The described polarizer 318 polarizes the input optical signal 316a but does not compensate for the polarization mode dispersion effects as would be by the polarization mode dispersion compensator unit.

The use of a passive-active interferometer instead of an all-active interferometer (the Alcatel 1901 ICM is all-active)

The use of an input optical amplifier (preamp) with the AO3R 314 to compensate for varying optical power levels at the input of the AO3R 314.

The use of optical waveguides or optical fiber to achieve the optical architecture of the interferometers 406 and/or 420.

Although several embodiments of the present invention has been illustrated in the accompanying Drawings and described in the foregoing Detailed Description, it should be understood that the invention is not limited to the embodiments disclosed, but is capable of numerous rearrangements, modifications and substitutions without departing from the spirit of the invention as set forth and defined by the following claims.

What is claimed is:

1. An all-optical 3R regenerator, comprising:
   a polarizer for polarizing an input optical signal;
   a laser;
   an interferometric converter module, coupled to said polarizer and said laser, for retiming and reshaping the polarized input optical signal and transmitting the retimed and reshaped polarized input optical signal as a polarized output optical signal; and
   a clock recovery mechanism, coupled to said laser and said interferometric converter module, for recapturing a clock signal of the polarized input optical signal by comparing a data stream in the polarized input optical signal to a data stream in the polarized output optical signal, said laser uses said recaptured clock signal to drive said interferometric converter module to retime the polarized input optical signal.

2. The all-optical 3R regenerator of claim 1, wherein said polarizer stabilizes the input optical signal which is of unknown, potentially varying phase and outputs the polarized input optical signal.

3. The all-optical 3R regenerator of claim 1, wherein said laser is an electro-absorptive laser diode.

4. The all-optical 3R regenerator of claim 1, wherein said interferometric converter module is a Mach-Zender interferometer.

5. The all-optical 3R regenerator of claim 1, wherein said clock recovery mechanism is a self-tunable clock recovery mechanism that is adaptable to varying data rates in the data stream of the polarized input optical signal.

6. A method for using an all-optical regenerator to retime, reshape and retransmit an input optical signal, said method comprising the steps of:
   receiving and polarizing the input optical signal;
   retiming and reshaping the polarized input optical signal and transmitting the retimed and reshaped polarized input optical signal as a polarized output optical signal; and
   comparing a data stream in the polarised input optical signal to a data stream in the polarized output optical signal to recapture a clock signal of the polarized input optical signal, wherein the recaptured clock signal is used to retime the polarized input optical signal.

7. The method of claim 6, wherein an interferometric converter module is used to retime and reshape the polarized input optical signal and transmit the retimed and reshaped polarized input optical signal as the polarized output optical signal.

8. The method of claim 6, wherein a clock recovery mechanism is used to compare the data stream in the polarized input optical signal to the data stream in the polarized output optical signal in order to recapture the clock signal of the polarized input optical signal.

9. The method of claim 8, wherein said clock recovery mechanism is a self-tunable clock recovery mechanism that is adaptable to varying data rates in the data stream of the polarized input optical signal.

10. An optical regenerator for retiming, reshaping and retransmitting an input optical signal, comprising:
    a polarizer for polarizing the input optical signal;
    a first coupler, coupled to said polarizer, for splitting the polarized input optical signal and outputting a first polarized input optical signal and a second polarized input optical signal;
    a laser;
    a first interferometer, coupled to said first coupler and said laser, for retiming and reshaping the first polarized input optical signal and transmitting the retimed and reshaped first polarized input optical signal as a polarized output optical signal;
    a second coupler, coupled to said first interferometer, for splitting the polarized output optical signal and outputting a first polarized output optical signal and a second polarized output optical signal;
    a phase comparator, coupled to said first coupler and said second coupler, for generating a phase mismatch signal in response to a phase difference between the second polarized input optical signal and the first polarized output optical signal;
    an optical-to-electrical converter, coupled to said phase comparator, for converting the phase mismatch signal into an electrical feedback signal;
    a low pass filter, coupled to said optical-to-electrical converter, for receiving the electrical feedback signal and outputting an averaged electrical feedback signal; and
    a voltage controlled oscillator, coupled to said low pass filter, for receiving the averaged electrical feedback signal and generating a clock signal used by said laser to enable said first interferometer to retime the first polarized input optical signal, wherein the second polarized output optical signal from said second coupler is outputted from said optical regenerator.

11. The optical regenerator of claim 10, wherein said polarizer stabilizes the input optical signal which of unknown, potentially varying phase and outputs the polarized input optical signal.

12. The optical regenerator of claim 10, wherein said laser is an electro-absorptive laser diode.

13. The optical regenerator of claim 10, wherein said first interferometer is a Mach-Zender interferometer.

14. The optical regenerator of claim 10, wherein said voltage controlled oscillator is a self-tunable voltage controlled oscillator that is adaptable to varying data rates in the data stream of the polarized input optical signal.

15. The optical regenerator of claim 10, wherein said phase comparator uses a second interferometer to obtain the phase difference between the second polarized input optical signal and the first polarized output optical signal.

16. The optical regenerator of claim 15, wherein said first and second interferometers are incorporated into a custom unit.

17. The optical regenerator of claim 15, wherein said first and second interferometers are made from optical waveguides or optical fiber.

18. The optical regenerator of claim 15, wherein said first and second interferometers are Michelson interferometers.

19. The optical regenerator of claim 10, further comprising a gain flattening device, connected to the second coupler, to compensate for wavelength dependent effects within the first and second interferometers.

20. The optical regenerator of claim 10, wherein said laser is a wavelength tunable laser.

21. The optical regenerator of claim 10, wherein said laser has an external Lithium Niobate modulator.

22. The optical regenerator of claim 10, wherein said laser is directly modulated.

23. The optical regenerator of claim 10, wherein said polarizer is polarization maintaining fiber.

24. The optical regenerator of claim 10, wherein said polarizer is a polarization mode dispersion compensator.

25. The optical regenerator of claim 10, further comprising a booster amplifier for amplifying the second polarized output optical signal.

26. A method for using an optical regenerator to retime, reshape and retransmit an input optical signal, said method comprising the steps of:
  polarizing, at a polarizer, the input optical signal;
  splitting, at a first coupler, the polarized input optical signal and outputting a first polarized input optical signal and a second polarized input optical signal;
  receiving, at a first interferometer, the first polarized input optical signal and retiming and reshaping the first polarized input optical signal and transmitting the retimed and reshaped first polarized input optical signal as a polarized output optical signal;
  splitting, at a second coupler, the polarized output optical signal and outputting a first polarized output optical signal and a second polarized output optical signal;
  generating, at a phase comparator, a phase mismatch signal in response to a phase difference between the second polarized input optical signal and the first polarized output optical signal;
  converting, at an optical-to-electrical converter, the phase mismatch signal into an electrical feedback signal;
  filtering, at a low pass filter, the electrical feedback signal and outputting an averaged electrical feedback signal; and
  receiving, at a voltage controlled oscillator, the averaged electrical feedback signal and generating a clock signal used by a laser to enable said first interferometer to retime the polarized input optical signal, wherein the second polarized output optical signal from said second coupler is outputted from said optical regenerator.

27. The method of claim 26, wherein said polarizer stabilizes the input optical signal which is of unknown, potentially varying phase and outputs the polarized input optical signal.

28. The method of claim 26, wherein said laser is an electro-absorptive laser diode.

29. The method of claim 26, wherein said first interferometer is a Mach-Zender interferometer.

30. The method of claim 26, wherein said voltage controlled oscillator is a self-tunable voltage controlled oscillator that is adaptable to varying data rates in the data stream of the polarized input optical signal.

31. The method of claim 26, wherein said phase comparator uses a second interferometer to obtain the phase difference between the second polarized input optical signal and the first polarized output optical signal.

32. A wavelength division multiplexing (WDM) optical network, comprising:
  at least one transmitter;
  at least one receiver coupled to said at least one transmitter by a transmission path, said transmission path has located therein at least one all-optical 3R regenerator that includes:
    a polarizer for polarizing an input optical signal;
    a laser;
    a first interferometer, coupled to said polarizer and said laser, for retiming and reshaping the polarized input optical signal and transmitting the retimed and reshaped polarized input optical signal as a polarized output optical signal; and
    a clock recovery mechanism, coupled to said laser and said first interferometer, that uses a second interferometer and electrical components to recapture a clock signal of the polarized input optical signal, said laser uses the recaptured clock signal to drive said first interferometer to retime the polarized input optical signal.

33. The WDM optical network of claim 32, wherein said all-optical 3R regenerator is adaptable to varying data rates in the data stream of the polarized input optical signal.

34. The WDM optical network of claim 32, wherein said all-optical 3R regenerator changes the wavelength of the input optical signal.

35. The WDM optical network of claim 32, wherein said first interferometer is a Mach-Zender interferometer.

36. The WDM optical network of claim 32, wherein said clock recovery mechanism is a self-tunable clock recovery mechanism.

* * * * *